(12) United States Patent
Zeiler et al.

(10) Patent No.: US 9,670,441 B2
(45) Date of Patent: Jun. 6, 2017

(54) METHOD FOR TREATING A FLUID, IN PARTICULAR A BEVERAGE

(75) Inventors: Martin Zeiler, Schwäbisch Gmünd (DE); Ralf Ascher, Alfdorf (DE); Roland Müller, Waldstetten (DE); Harry Frison, Schwäbisch Gmünd (DE)

(73) Assignee: PALL CORPORATION, Port Washington, NY (US)

( * ) Notice: Subject to any disclaimer, the term of this patent is extended or adjusted under 35 U.S.C. 154(b) by 1425 days.

(21) Appl. No.: 13/181,591

(22) Filed: Jul. 13, 2011

(65) Prior Publication Data

US 2012/0015086 A1    Jan. 19, 2012

(30) Foreign Application Priority Data

Jul. 14, 2010   (EP) ..................... 10169583

(51) Int. Cl.
  *C12H 1/02*   (2006.01)
  *C12H 1/056*  (2006.01)
  *A23L 2/80*   (2006.01)

(52) U.S. Cl.
  CPC .............. *C12H 1/0424* (2013.01); *A23L 2/80* (2013.01)

(58) Field of Classification Search
  CPC ................................ C12H 1/0424; A23L 2/80
  USPC ................. 426/590, 592, 330.4, 330.5, 490; 210/797, 190
  See application file for complete search history.

(56) References Cited

U.S. PATENT DOCUMENTS

| | | | |
|---|---|---|---|
| 4,820,420 | A | 4/1989 | Hums et al. |
| 5,484,620 | A | 1/1996 | Oechsle et al. |
| 6,117,459 | A | 9/2000 | Van Den Eynde et al. |
| 2001/0001676 | A1 | 5/2001 | O'Reilly |
| 2010/0176069 | A1 | 7/2010 | Meffert et al. |

FOREIGN PATENT DOCUMENTS

| | | |
|---|---|---|
| EP | 0 569 568 | 11/1993 |
| EP | 0 645 446 | 3/1995 |
| JP | 2009-125690 | 6/2009 |
| WO | WO 2008-110632 | 9/2008 |

OTHER PUBLICATIONS

Canadian Examiner's Report, Application No. 2,746,113, dated Sep. 11, 2012.
Drawert, F., Prof. Dr., Brautechnische Analysenmethoden, 1982, pp. 658-659, vol. 3.
European Patent Office, European Search Report in European Patent Application No. 10 16 9583.1 dated Feb. 1, 2011.

(Continued)

*Primary Examiner* — Vera Stulii
(74) *Attorney, Agent, or Firm* — Jeremy Jay

(57) ABSTRACT

A method for treating a fluid is provided using a particulate material in the form of a deposited layer having an upstream side and a downstream side wherein a flow of the fluid is directed through the deposited layer from the upstream to the downstream side at a first temperature. The method includes reconditioning the deposited layer and then resuming treatment of the fluid, wherein reconditioning comprises heating the deposited layer to a second temperature; and cooling the deposited layer to a third temperature at an average cooling rate in the range of up to about 20° C./min.

22 Claims, 8 Drawing Sheets

(56) References Cited

OTHER PUBLICATIONS

Sarioglu, K., "Synthesis of octadecyl acrylate co-ethylene glycol dimethacrylate resin for removal of dark-colored compound from apple juice and comparison with polyvinylpolypirrolidone (PVPP)," Eur Food Res Technol, Jul. 28, 2006, pp. 443-449, vol. 225, Department of Food Engineering, Faculty of Engineering, Kayseri, Turkey. (XP-002616129).
Written Opinion, Singapore Application No. 201104994-7, dated Jun. 7, 2012.

METHOD FOR TREATING A FLUID, IN PARTICULAR A BEVERAGE

BACKGROUND OF THE INVENTION

The present invention relates to a method for treating a fluid, in particular a beverage, more specifically beer.

Fluids, including beverages are treated for numerous purposes. During the manufacturing of beverages like beer, wine or fruit juices a so called stabilization process is needed which at least substantially reduces the amount of components in the fluid which might give rise to flocculation or development of haze during storage and transportation of the fluid. Filtration and adsorption are the most important mechanisms used to this end. Other fluids need treatment with respect to, e.g., removal of suspended solids, others are to be subjected to chemical reactions.

Frequently, layers of deposited particulate material are used to perform such treatments, such layers may be used in the form of a filter cake.

EP 0 645 446 A1 suggests to deposit the particulate material in a cartridge on a fluid-permeable wall portion, said cartridge including a fluid inlet upstream of the deposited layer and a fluid outlet downstream of said fluid-permeable wall portion.

Cartridges of such design are widely used in the treatment of fluids, especially beverages, on an industrial scale since the cartridges can easily be designed to accommodate larger quantities of particulate material and are simple to handle.

During the treatment of the fluids the fluid is forced to pass through the deposited layer by a fluid pressure. Because of various technical reasons the fluid pressure cannot be kept constant but rather pressure fluctuations are frequently observed.

Numerous useful particulate materials form deposited layers which may crack under various conditions, e.g., the above mentioned pressure fluctuations, temperature changes or other physical or chemical impacts creating gaps leading from the upstream to the downstream side of the deposited layer. As a consequence a homogeneous fluid flow through the deposited layer is no longer guaranteed affecting the quality of the treated fluid.

In order to cope with this problem the deposited layer will have to be replaced frequently in order to ensure reliable quality of the treated fluid. The particulate material however has not been exhausted in its treatment capacity.

Some of the desirable particulate materials, like PVPP (polyvinyl polypyrrolidone) are not suitable for use in such cartridges at all and can be used as a stabilizing agent only in so-called dosing systems, where the PVPP particles are fed into the fluid and have to be removed subsequently by filtration. The loss of PVPP particles is substantial in such a procedure.

BRIEF SUMMARY OF THE INVENTION

Object of the present invention is to provide a method wherein the deposited layer of particulate material may be used for an extended period of time and which allows to use particulate material previously not suitable.

The above object is solved by a method having the features of claim 1.

The fluid to be treated is preferably a liquid, more preferably an aqueous liquid like a beverage as noted above.

Preferably the deposited layer is incorporated into a cartridge which allows an easier handling.

The inventive method provides for an opportunity to use PVPP particles as a particulate material which heretofore could be used in a substantially less economical way.

The risk of crack formation in a PVPP cake which results in a massive decline of the stabilization effect of the fluid to be treated would result in a process which is not controllable.

Often not only one cartridge but a plurality of cartridges each accommodating a deposited layer of particulate material is used in a common housing and the fluid to be treated is fed to the fluid inlets of the cartridges in parallel. In case of a crack formation in one of the cartridges not only the one element where the crack formation occurred would have to be replaced, but all of the cartridges at the same time in order not to risk an uncontrollable treatment of the fluid, e.g., the beverage. While such procedure is costly since a large amount of particulate material is wasted it cannot be avoided because otherwise one would run an even higher economic risk.

The present invention provides a method which even allows to use such difficult-to-handle particulate material like PVPP which itself has highly esteemed properties in the stabilization of beverages.

The key element of the present invention is the reconditioning of the deposited layer within the cartridge within the boundaries set out in claim 1.

The key elements of the reconditioning treatment of the deposited layer according to the present invention reside in the steps of a) heating the deposited layer to a second temperature, e.g., 85° C., where the first temperature typically is about room temperature or less;

b) afterwards cooling the deposited layer to a third temperature, e.g., about 30° C., with an average cooling rate of up to about 20° C./min.

Heating of the deposited layer to a second temperature of about 70° C. or more, more preferably to about 80° C. or more, has the advantage that thereafter the layer is in a sanitized condition. For sanitizing the deposited layer the second temperature is preferably maintained at 70° C. or more for about 20 min or more.

Preferably the deposited layer is kept at the second temperature for several minutes, e.g., about five minutes or more, preferably about ten minutes or more, before the cooling step is initiated.

While the heating rate is not critical, the average cooling rate has to be carefully controlled in order not to exceed the afore-mentioned upper limit of about 20° C./min.

The cooling step can be accomplished in a number of ways, e.g., by gradually decreasing the temperature or by stepwise alterations of the cooling rate including one or more steps. Preferably, however, a maximum cooling rate of about 20° C./min should not be exceeded at any time during the cooling step. As a lower limit for the cooling rate, a value of about 0.1° C./min, more preferably 0.5° C./min, may be selected under practical considerations.

The reconditioning treatment according to the present invention allows curing of deficiencies of the deposited layer in that the particulate material is redistributed and/or restructured in the deposited layer such that a homogeneous treatment across the whole area of the deposited layer is obtained.

The method of the present invention thus allows using the particulate material of the deposited layer in the cartridge for an extended period of time, e.g., six to twelve months of operation before the particulate material has to be replaced.

The method of the present invention may be carried out in a highly automated environment with fewer personnel.

Thus not only a lot of working time is saved, but also a most effective use of the sometimes costly particulate material is possible.

While heating of the deposited layer to a second temperature and cooling the same to a third temperature may be accomplished by simple heating and cooling means without any additional measures by, e.g., by heating the cartridge and cooling the same from the outside, it is preferred to perform at least part of the reconditioning treatment by directing a flow of a reconditioning fluid through the deposited layer.

Directing a flow of a reconditioning fluid through the deposited layer facilitates and improves redistribution and more homogeneously acts on the particulate material of the deposited layer and provides for a more pronounced effect of such reconditioning treatment.

While the applicants do not wish to be bound by the explanations below, it is believed that during the heating step of the reconditioning treatment to a second temperature the thermal expansion of the particulate material creates pressure within the deposited layer in a direction perpendicular to the fluid flow direction which causes eventual cracks in the deposited layer to be eliminated or closed. At the same time, a redistribution of the particulate matter occurs and upon carefully controlled cooling such redistributed particulate material of the deposited layer within the boundaries set out in claim 1 is retained in its redistributed condition.

Even more preferably, a reconditioning fluid is used as a coolant in order to cool down the deposited layer to the third temperature. Use of a reconditioning fluid as coolant allows for a better control of the cooling rate and the cooling will be effective in a similar way across the whole of the cross-section of the fluid flow, i.e., the whole area of the deposited layer.

Preferably, the reconditioning fluid is additionally used as a heating means during the step of heating the deposited layer to the second temperature.

It is readily apparent that the reconditioning fluid can be circulated during heating and cooling of the deposited layer and heated by a heating device and cooled by a cooling device upon circulation to the desired temperature, respectively.

The reconditioning fluid used for heating the deposited layer may be different from a reconditioning fluid for cooling the deposited layer.

In fact, in many applications the reconditioning fluid or fluids may be selected to perform an additional task, especially the regeneration of the particulate material.

In beverage stabilization applications, an alkaline reconditioning fluid used for heating the deposited layer may likewise serve to desorb and remove polyphenols which upon treatment of the beverage have been adsorbed by the particulate material and thereby regenerate the particulate material. In a subsequent heating or cooling step, fresh water may be used as a reconditioning fluid in order to purge the deposited layer from the alkaline reconditioning fluid. Subsequently, an acidic reconditioning fluid may be used for (further) cooling the deposited layer and finally another purge with fresh water as a reconditioning fluid may be used to finally provide the deposited layer ready for another treatment cycle of the beverage.

Typically, the fluid treatment will be interrupted before the reconditioning is initiated. However, this is not a mandatory measure and the treatment of the fluid may even continue in special cases upon reconditioning of the deposited layer. The fluid to be treated can serve as a reconditioning fluid as has be addressed above in more detail.

If a reconditioning fluid different from the fluid to be treated is used the deposited layer will be purged from the fluid to be treated before or at the beginning of the reconditioning and replaced by the reconditioning fluid. At the end of the reconditioning the reconditioning fluid will be removed and the deposited layer purged before the treatment of the fluid to be treated is resumed.

The cooling rate mentioned above is most preferably controlled by measuring the temperature of the reconditioning fluid serving as a coolant downstream of the deposited layer, e.g., at the fluid outlet of the cartridge. By determining the temperature of the reconditioning fluid which serves as a coolant downstream of the deposited layer, e.g., at the fluid outlet of the cartridge, a most economic and accurate determination of the temperature conditions present during cooling of the deposited layer is achieved independent of the fluid flow rate and the temperature difference between the circulated reconditioning fluid and the actual temperature of the cartridge and the particulate material contained therein as well as its specific heat capacity.

As mentioned before, the heating rate during the heating step of the reconditioning treatment is not too critical, nevertheless heating rates of up to about 20° C./min when heating the deposited layer from the first temperature to a fourth temperature are preferred. The fourth temperature in such embodiment is lower than or equal to the second temperature, e.g. about 10° C. lower than the second temperature. A lower limit for the heating rate will preferably be about 0.1° C./min, more preferably of 0.5° C./min, for practical reasons.

In a number of applications of the present invention, treatment of the fluid includes a process which is based on an additive which may be consumed during the fluid treatment either by dissolving and eluting the same from the deposited layer or by rendering it inactive. In such cases, it is advantageous to use the reconditioning fluid and feed an additive into the deposited layer thereby restoring the original treatment properties of the deposited layer.

In a preferable embodiment of the present invention, the deposited layer is originally formed by packing the particulate material into the cartridge with a density higher than the bulk density of the particulate material in the wet state, wherein more preferably the initial density of the packed particulate material of the deposited layer corresponds up about 120% of the bulk density in the wet state. A noticeable effect will be observed starting with a packing density of about 101%.

This measure not only provides optimum use of the volume provided by the cartridge for accommodating the particulate material, but in addition further improves the stability of the deposited layer in its integrity and the homogeneous distribution of the particulate material within the deposited layer during the continued treatment of the fluid, e.g., beverage.

Depending on the nature of the particulate material used for making the deposited layer, the permeability or fluid flow resistance of the deposited layers may differ, even if the density of the packed particulate materials is the same.

In the brewing technology, the fluid flow resistance of accumulated particulate PVPP is characterized by a so-called water equivalent which is determined according to Drawert, Brautechnische Analysenmethoden, Vol. III, published by MEBAK 1982, pages 658-659, 10.1.6.2 Methode Schenk.

The preferred water equivalent of a deposited layer of PVPP particulate material to be used in the method of the present invention is about 200 l/h*1600 cm$^2$ or more, more preferably about 205 l/h*1600 cm$^2$ or more. Most preferable are water equivalents of about 300 l/h*1600 cm$^2$.

The selection of PVPP particulate material may also be made on the basis of its ability to adsorb catechol. Catechol is used in such a test as a model substance for polyphenols to be removed during a stabilization treatment of beverages. Preferred PVPP particulate materials show a catechol reduction of about 30% or more, more preferred of about 35% or more, while optimum results in the stabilization process of beverages may be expected when the catechol reduction amounts to about 40% or more.

The catechol reduction test is carried out as follows:

An amount of 80 mg of (+) catechol hydrate (Aldrich Chem. Co., Milwaukee, USA) is dissolved in 50 ml of ethanol at room temperature. The catechol solution is subsequently admixed with distilled water to give a solution S of 1 liter which is stored in a brown flask.

A reference solution R is prepared from 50 ml ethanol to which distilled water is added to give a solution of 1 liter.

Four flasks of a volume of 150 ml are each provided with an amount of 50 mg PVPP particulate material to be tested. 100 ml of the catechol solution S is added to two of these flasks. To the remaining two flasks 100 ml of the reference solution R is added.

The contents of the flasks are thoroughly mixed for five minutes. Thereafter the supernatant is decanted into fresh flasks. It is important to decant the supernatant exactly five minutes after the full 100 ml have been added to the respective flask. Since the supernatant must be free of particulate material, it is filtered through a 0.45 μm filter. Supernatants (SN) obtained from solution S are referred to $SN_S$ whereas supernatants obtained from the reference solutions are referred to as $SN_X$.

It is recommended to keep the flasks containing the filtered supernatants $SN_S$ and $SN_X$ for 1 h in a dark cool place before the supernatants are tested for UV-absorption.

It is recommended to use the UV absorption of catechol at 280 nm for measuring and calculating the PVPP adsorption capacity, i.e., catechol reduction, in accordance with the following formula:

$$\text{adsorption capacity } [\%]=100*(E_{100}-(E_S-E_X))/E_{100}$$

wherein
$E_{100}$=extinction of solution S
$E_X$=extinction of reference solution $SN_X$
$E_S$=extinction of sample solution $SN_S$
All extinctions are measured against reference solution R.

The parameter of catechol reduction not only describes the activity of the PVPP material upon polyphenols, but at the same time is influenced by the particle size distribution and the surface area provided by the particulate material. While small particles are preferred because of their high surface area, a particle distribution including a too high amount of small particles will lead to an excessive high pressure differential across the deposited layer.

For many applications, the particulate material preferably comprises predominantly in weight percent particles with a size of about 25 μm or more.

Smaller particles than 25 μm may be present without substantially affecting the favorable results obtained by the inventive method. However, it is preferred to limit the amount of particles smaller than 25 μm to about 15% by weight, more preferably to about 10% by weight or less, even more preferably to about 5% by weight or less.

If the amount of particles smaller than 25 μm is higher than the amount of about 15% by weight, a too high pressure differential is observed which renders the use of such deposited layers uneconomical.

The inventive method is especially advantageous for use of particulate materials comprising particles which are compressible and/or swellable in the fluid to be treated. An example for such a material is PVPP in aqueous media.

Another preferable particulate material comprises particles in the form of beads and, more preferably, essentially consists of particles in the form of beads. Here, the more homogeneous form of the particles typically provides for a low pressure differential.

While numerous particulate materials may be used according to the present invention, for treating beverages, particles are advantageously selected from agarose, PVPP, PA, zeolite, activated carbon, and/or diatomaceous earth.

Compressible particles allow a higher packing density when originally deposited as a layer in the cartridge. This type of particles provides for additional advantages in that again the stability of the homogeneity of the deposited layer may be increased.

The treatment of the fluid according to the present invention encompasses numerous treatments including the preferred treatments of adsorption, filtration, doping and/or subjecting the fluid to a chemical reaction.

A chemical reaction performed with the present method is preferably a catalytic reaction which does not consume an additive contained in the deposited layer, but the catalytic additive in the deposited layer may be used for an extended period of time and/or regenerated or replenished during reconditioning of the deposited layer.

As mentioned before, the present invention is most suited for treating aqueous fluids, preferably beverages, and in particular beer, wine and fruit juice.

Treatment of beverages for stabilization, especially beer, wine, or fruit juice is preferably effected by using PVPP particulate material.

Furthermore, according to the present invention, a multiplicity of deposited layers may be used where preferably each deposited layer is incorporated in a separate cartridge, the cartridges being provided in a common housing having an inlet communicating in parallel with the fluid inlets of the cartridges and an outlet communicating in parallel with the fluid outlets of the cartridges.

Preferably, the multiplicity of deposited layers in their cartridges is provided in the form of a stack, said stack being more preferably oriented in a vertical direction.

When the multiplicity of cartridges is accommodated in a common housing having a fluid inlet and a fluid outlet, the average cooling rate is preferably determined in such embodiments by measuring the temperature of the reconditioning fluid at the outlet of the common housing.

When such stack is used, the heating step of the reconditioning treatment is preferably performed by introducing the reconditioning fluid into the housing at its bottom end.

The cooling step then is preferably performed by introducing the reconditioning fluid into the stack at its top end.

In the following, the invention in its various aspects and advantages will be explained in more detail in connection with the Figures and Examples.

BRIEF DESCRIPTION OF THE DRAWINGS

In the Figures

FIG. 4 D sows a graphical representation of various parameters during the inventive reconditioning of a deposited layer;

DETAILED DESCRIPTION OF THE INVENTION

Figure 1:
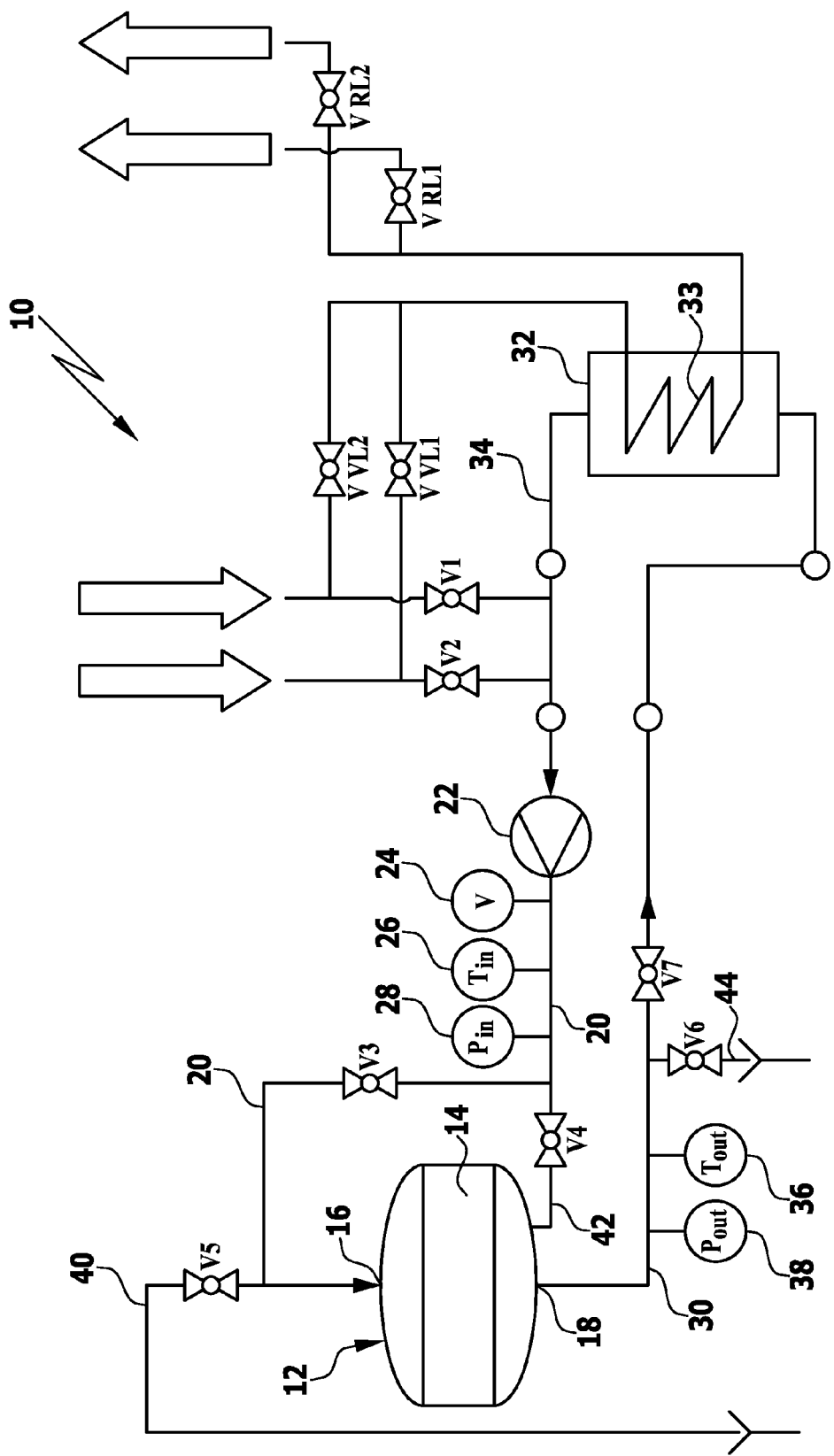
FIG. 1 shows a schematic outline of an apparatus for carrying out the reconditioning treatment of the inventive method.

FIG. 1 shows a schematic representation of an arrangement 10 for carrying out a key process of the inventive method, namely a reconditioning treatment of a deposited layer of particulate material which has been used to treat a fluid, e.g., a beverage like beer, wine, or fruit juice.

The arrangement 10 includes a housing 12 accommodating a cartridge 14 in which a layer of particulate material (not shown) has been deposited. The housing 12 comprises a fluid inlet 16 at the top and a fluid outlet 18 at the bottom thereof.

Of course, housing 12 may be provided with larger dimensions such that it may accommodate a stack of a multiplicity of cartridges 14.

The fluid inlet 16 is connected to a pipe 20 which provides a fluid flow path from inlet 16 to a pump 22, e.g., a flow-controlled centrifugal pump.

Pipe 20 is preferably equipped with a flow-meter 24, a temperature sensor 26 and a pressure sensor 28 which allow monitoring the temperature, pressure and flow rate of the fluid fed via pump 22 and pipe 20 to inlet 16 and the upstream side of the deposited layer of particulate material accommodated in cartridge 14.

The outlet 18 is connected to a pipe 30 which leads to a heat exchanger 32 which is connected via a pipe 34 to the inlet of pump 22 thereby forming a closed loop.

Pipe 30 connecting the outlet 18 with the heat exchanger 32 is equipped with a temperature sensor 36 and a pressure sensor 38 which allow monitoring of the downstream pressure of the reconditioning fluid circulated through cartridge 14 as well as its downstream temperature.

Once cartridge 14 has been placed into housing 12, the same is closed and the closed loop constituted by pump 22, pipe 20, housing 12 with cartridge 14, pipe 30 and the heat exchanger 32 and tube 34 is filled with a reconditioning fluid which preferably has already an elevated temperature via valve V1.

Pipe 20 includes close to inlet 16 a branch 40 which can be connected to pipe 20 and inlet 16 or shut off via valve V5. Upstream of branch 40 pipe 20 includes a shut-off valve V3 and a further branch 42 connectable to pipe 20 via a valve V4.

Pipe 30 may be shut off by a valve V7. Upstream of valve V7 pipe 30 may be connected to a branch pipe 44 via a shut-off valve V6.

When filling the closed loop with the hot water, at the beginning of the reconditioning, valves V1, V3, V4 and V5 are open so that air contained in the closed loop may be withdrawn and an initial amount of reconditioning fluid may be dumped through branch pipe 44 while valve V6 is open. Subsequently, valve V7 is opened and the loop completely filled. The valves V4 and V5 will be closed and the heating step by passing the reconditioning fluid through a deposited layer in cartridge 14 may start.

During an initial phase of the heating step, valve V6 may remain open to discharge a fraction of the recycling reconditioning fluid which is replaced by fresh fluid supplied via valve V1 into the loop. This procedure allows to dump fractions of reconditioning fluid which may at the beginning of the reconditioning of the deposited layer be heavily loaded with matter desorbed from the particulate material in cartridge 14.

Thereafter, valves V1, V2, V5 and V6 remain or are closed whereas valves V3 and V7 are open.

The pressure and temperature sensors 36 and 38 monitor the condition of the reconditioning fluid when exiting housing 12. The fluid is then fed into heat exchanger 32 where the fluid is again heated to a pre-set temperature.

To that effect, the heat-exchanger is connected via valves VVL2 and VRL2 to a heating device (not shown) for circulating a heating medium (e.g., hot water) through the heat exchanger 32 and its heat exchange pipe 33. Once the temperature sensor 36 indicates that the deposited layer has been heated to the targeted second temperature, the valves VVL2 and VRL2 are eventually closed and reopened as necessary to maintain the temperature of the reconditioning fluid at the second temperature.

After a pre-set time which preferably ensures that the deposited layer is in a sterile condition, the heat exchanger is connected to a cooling device (not shown) and the valves VVL1 and VRL1 are opened in order to circulate a cooling medium through the heat exchange pipe 33 of heat exchanger 32.

Subsequently, the cooled reconditioning fluid is circulated in a closed loop constituted by pump 22, pipe 20, housing 12 with cartridge 14, pipe 30, heat exchanger 32 and pipe 34. The cooling rate is monitored via temperature sensor 26.

The cooling rate of the deposited layer furthermore is monitored by temperature sensor 36 connected to pipe 30 close to the outlet 18 of housing 12. This temperature sensor 36 indicates the cooling rate of the deposited layer within cartridge 14.

FIG. 2 shows an exemplary cartridge to be used in accordance with the present inventive method to accommodate the deposited layer of particulate material.

Figure 2A:
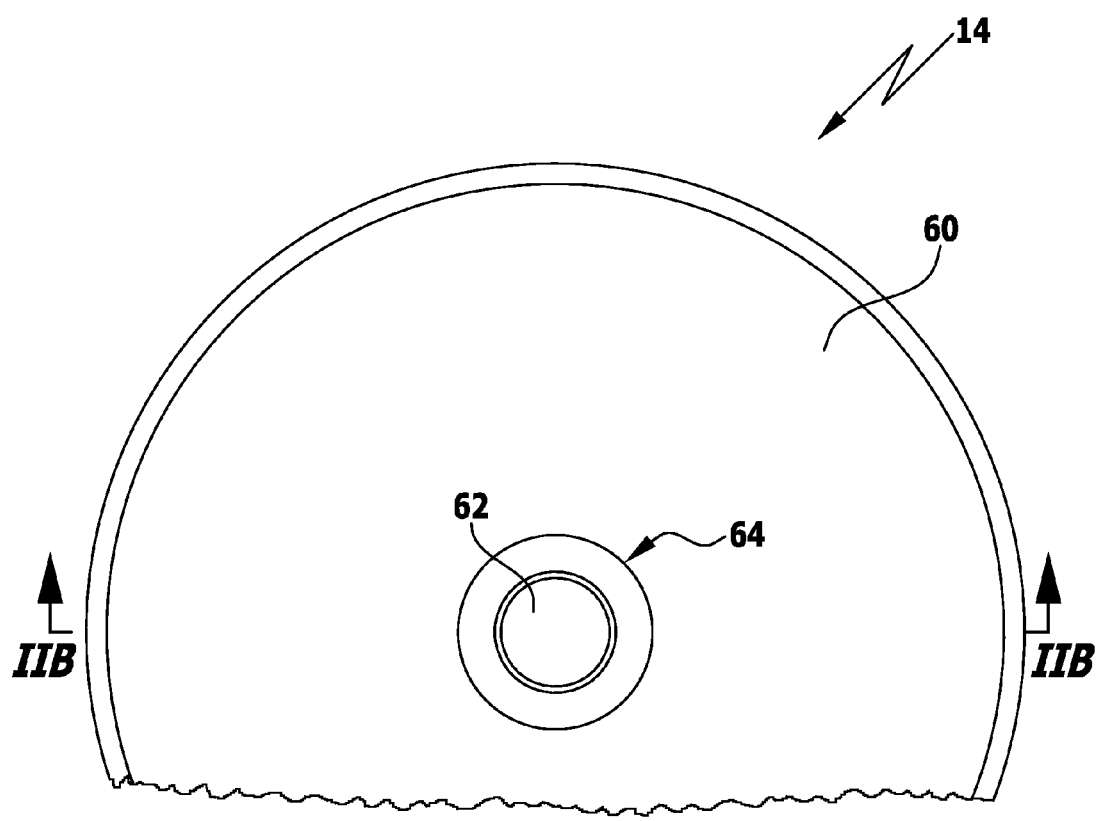
FIGS. 2 A and B show details of an exemplary cartridge for accommodating a deposited layer of particulate material used in the inventive method.
Figure 2B:
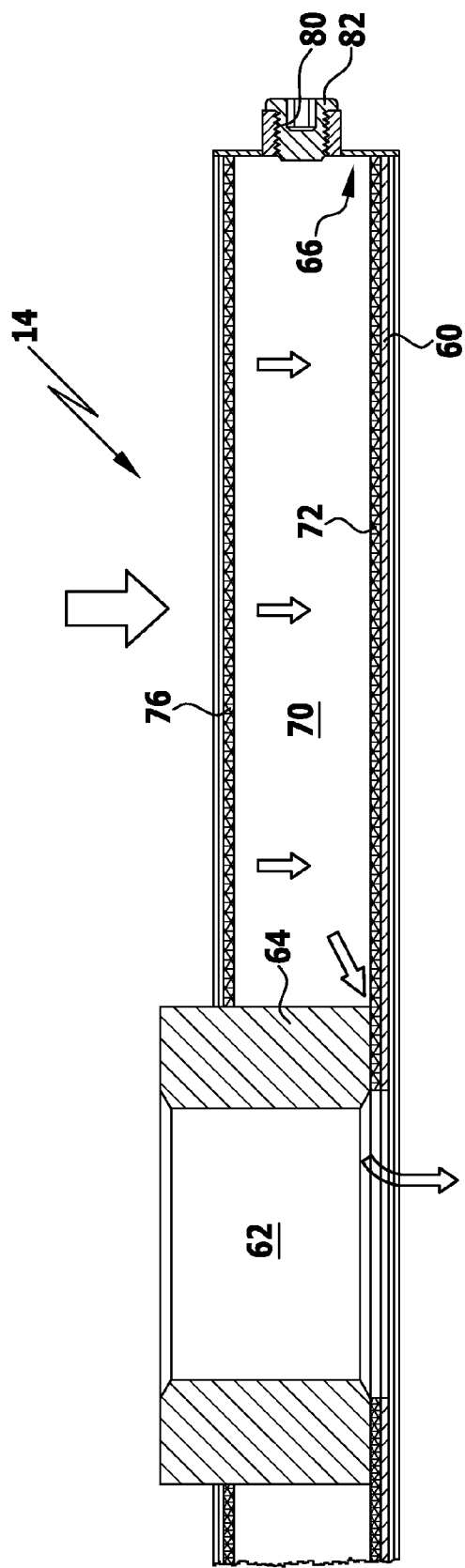

FIG. 2A represents a bottom view of cartridge 14 having an essentially disk-shaped fluid-tight bottom wall 60 with a central opening 62 to which a central hub 64 is mounted.

At the outer periphery of bottom wall 60, a side wall 66 is attached, e.g., in a welding step.

The side wall 66 is running around the whole of the periphery of bottom wall 60 so as to define a chamber 70 which accommodates the particulate material in the form of a deposited layer.

The bottom portion of the volume 70 is covered by a mesh material 72 having openings small enough to retain the particulate material of the deposited layer and being nevertheless pervious for the fluid to be treated and for the reconditioning fluid or fluids to be used upon reconditioning of the deposited layer.

The mesh material 72 covers essentially all of bottom wall 60 and extends to the central opening 62. When mounting the hub 64 on the bottom wall 60, the mesh material 72 is clamped in between the hub 64 and the bottom wall 60, thereby allowing drainage of volume 70 into the central channel defined within hub 64.

The top surface of cartridge 14 may be left open, in case the cartridge is filled and operated in a horizontal position. For practical reasons it is preferred to close the top of cartridge 14 with a disk-shaped cover made of a mesh material 76 which is fixed to the side wall 66, e.g., by welding so as to close the upper end of volume 70 and to retain the particulate matter within volume 70. The mesh material 76 is attached to an upper portion of hub 64 so as to avoid a fluid flow directly from the uppermost portion of volume 70 into the central channel of hub 64. The mesh material 76 may be removably attached to sidewall 66 and the hub 64.

The side wall 66 of cartridge 14 is provided with an inlet 80 which is closed by a plug 82 once the volume 70 of cartridge 14 has been filled to the desired extent with particulate material.

The central hub 64 not only serves as an outlet for cartridge 14, but also to fix the mesh material 72 and 76 in the central portion of cartridge 14. In addition, it may be designed at its upper and lower surface portions so as to accommodate corresponding cartridges when the cartridges are stacked on top of one another to form a multi-cartridge stack as described before.

While the cartridge 14 and its various parts may be made of metal and may be used in multiple cycles with the particulate material replaced in volume 70, it is also conceivable to make the cartridge 14 from plastic parts which are filled once and are discarded together with the consumed particulate material at the end of its life cycle.

The dimensions of the cartridges used in the examples described in connection with the invention have an inner diameter of about 540 mm and a filling height of about 30 mm, the inner diameter of the hub 64 is about 65 mm, the outer diameter of the hub is about 116 mm. Volume 70 provided by such cartridge amounts to about 6.5 l.

Figure 3:
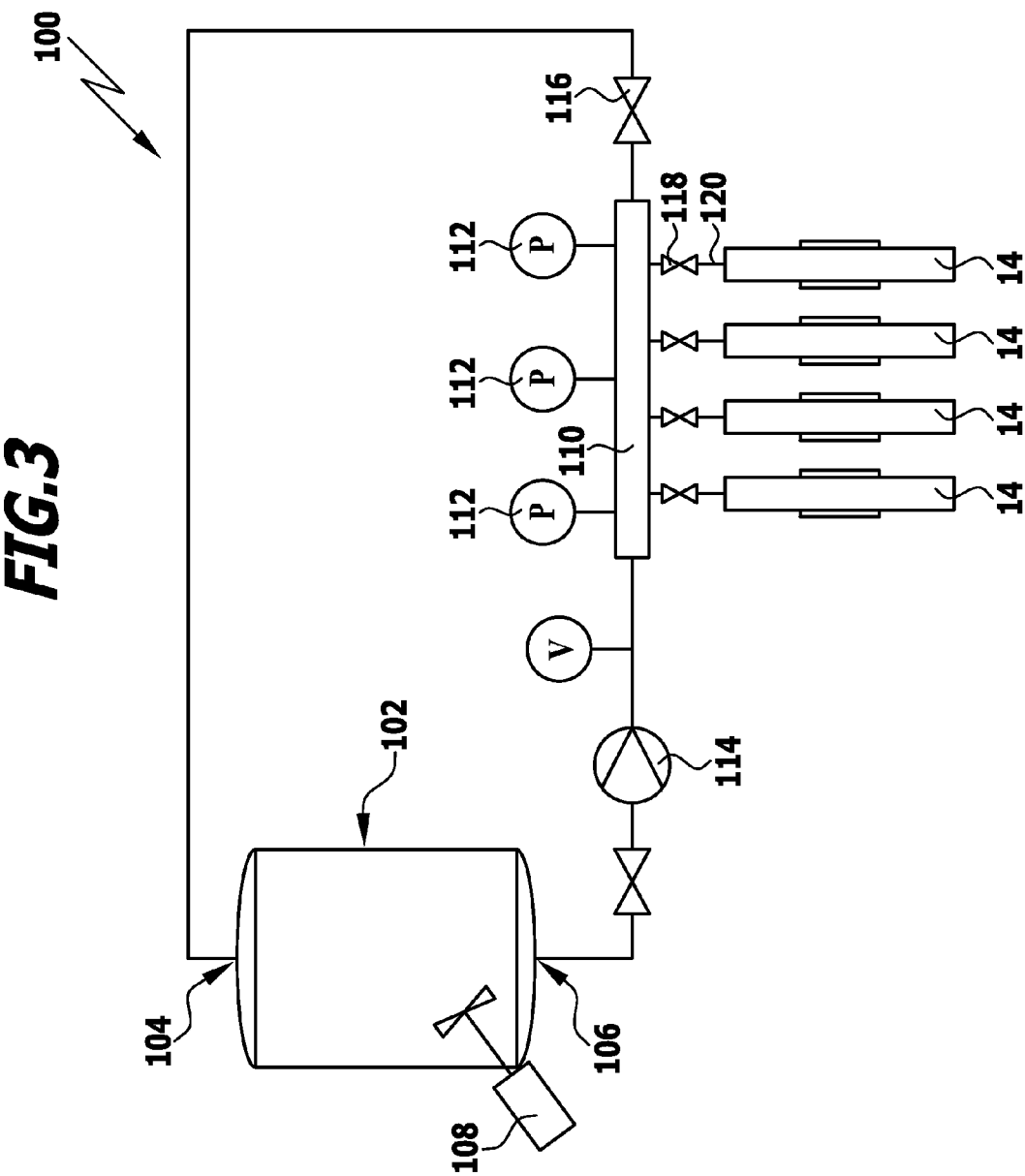
FIG. 3 shows an exemplary device for feeding particulate material into a plurality of cartridges to form deposited layers.

FIG. 3 shows a schematic representation of an arrangement 100 which may be used to fill multiple cartridges 14 at the same time with the particulate material.

To that extent, the arrangement 100 comprises a tank 102 equipped in its upper portion with an inlet 104 and in its bottom part with an outlet 106. Furthermore, in the bottom portion of tank 102, an agitator 108 is provided which allows stirring the contents of tank 102, e.g., a suspension of a particulate material to be filled into the cartridges 14.

The cartridges 14 are positioned in a vertical standing position and connected with their inlet openings 80 to a filling pipe 110 which receives the suspension contained in tank 102 via centrifugal pump 112.

Filling pipe 110 is equipped with one or more pressure sensors in order to monitor the inlet pressure during filling of the cartridges 14. The inlet pressure monitored by the sensors 112 determines the degree of packaging of the particulate material within the cartridges 14.

In case a swellable particulate material like PVPP is used the particles first of all are allowed to absorb the surrounding fluid, e.g., water. For PVPP particles a swelling time of about 4 h is sufficient, more preferable are swelling times of about 10 h. The suspension comprises preferably about 2 to 10% by weight, more preferably about 3 to about 5% by weight of PVPP particles. The suspension is then stirred in the tank 102 and subsequently circulated in the loop by the centrifugal pump 112 for about 15 min without filling the cartridges at a flow rate of about 4 m$^3$/h. Depending on the particulate material and the specific equipment used fine-tuning of the flow rate may be advisable so as to avoid deposition and/or fractionating of particles in the loop. Subsequently the cartridges may be connected to the loop via the ball valves 118 and feed lines 120.

In the beginning of filling of the cartridges 14, the fluid suspending the particulate material exits the cartridges 14 via their top wall 76 and hub 64. Upon successive filling of the cartridges 14, the amount of fluid exiting the cartridges 14 becomes smaller until it nearly stops at the end of the filling procedure when a sort of plug of particulate material has been created at the inlet 80 of the cartridges 14.

Downstream of the filling pipe, a valve 116 is provided in the loop which may be used to adjust the filling pressure which is sensed at the filling pipe 110 at one or several positions. The pressure sensors 112 indicate the pressure under which the cartridges are filled and determine the filling degree or packing of the individual cartridges. Preferably, the pressure differential for filling the cartridges 14 is about 0.3 bar.

It is important to fill the cartridges 14 with the particulate material free of voids.

Typical filling times may be in the range of about 20 to about 30 min for cartridges 14 as shown in FIG. 2 with a volume 70 of about 6.5 l.

The cartridges 14 are then disconnected from the filler pipe 110 and the inlets 80 in the side wall 66 of the cartridges 14 are closed with blind plugs 82.

In case a pre-compressed PVPP layer is wanted within the cartridges 14, preferably PVPP and a certain amount of a filler material soluble in water is filled into the cartridges 14 in a dry state. Upon passing a flow of water through the cartridges and rinsing out the filler material, the PVPP particles will swell and generate a pre-compressed filter cake within the cartridge 14. As water-soluble filler materials, especially food-compliant materials, e.g., salts and sugars, can be used.

Taking into consideration the swelling effect obtained with PVPP of about 1.4 times of its dry volume, the amount of filler has to be calculated in order to avoid inadmissible overfilling or overpacking of the cartridge 14 and the creation of a too high pressure difference during the following step, namely the use of the cartridge 14 for stabilizing the beverage.

It is recommended to do some pre-tests on a laboratory scale in order to find out the optimum percentage for a certain filler material to be admixed with PVPP particles.

Figure 4A:
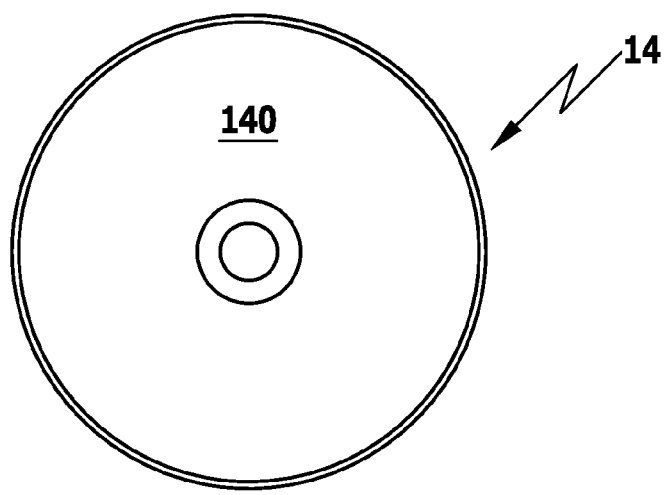
FIGS. 4 A, B and C show a cartridge accommodating a deposited layer of particular matter in the original, cracked and reconditioned state, respectively.

FIG. 4A shows the filled cartridge 14 after the top mesh material 76 has been removed and the originally deposited layer 140 in a cartridge 14 shows a smooth surface.

In order to demonstrate the effect of the present invention upon reconditioning of the deposited layer, a layer made of PVPP particulate matter has been voluntarily cracked as will be described below.

Figure 4B:
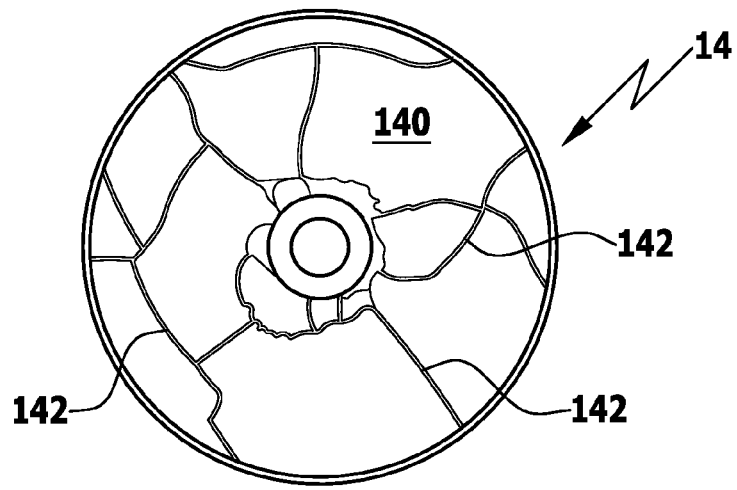

After filling of the cartridge 14, the deposited layer obtained has been voluntarily cracked by repeated start-stop fluid-flow cycles and additionally been damaged by introducing compressed air (cf. FIG. 4B). The deposited layer 140 shows a plurality of severe cracks 142 which constitute short cuts from the upstream surface of layer 140 to the mesh material 72 of the cartridge, i.e., the downstream surface of the deposited layer.

Thereafter the cartridge 14 comprising the damaged deposited layer 140 has been subjected to the following conditions:

The top of cartridge 14 as shown in FIG. 4B is provided with the cover of mesh material 76. The cartridge is subsequently mounted in housing 12 of the reconditioning arrangement 10 of FIG. 1 and the housing is closed.

In an initial step the reconditioning arrangement is filled with cold water having a temperature of 2° C., corresponding to the first temperature at which typically a beverage like beer is stabilized. The cold water is recirculated for about 10 minutes in order to determine the pressure differential of the cracked deposited layer. The value of the pressure differential measured is 0.73 bar at 2° C. and a flow rate of the cold water of 0.59 m³/h.

Thereafter the temperature of the recirculated water is increased at a rate of about 6° C./min until the temperature at the outlet of the housing 12 (as determined by temperature sensor 36) is about 70° C. (fourth temperature). The flow rate is kept constant at 0.59 m³/h.

The temperature is further increased at a gradually lowered rate to the second temperature of 85° C. The treatment of the deposited layer at a temperature of 80° C. or more is continued for about 20 min at still the same flow rate of the recirculated water of 0.59 m³/h. Subsequently the deposited layer is cooled at a controlled cooling rate of about 5.5° C./min to a third temperature of about 20° C.

FIG. 4 D schematically represents the parameters temperature (curve A), flow rate (curve B) and pressure differential (curve C) as determined during the above described procedure.

Figure 4C:
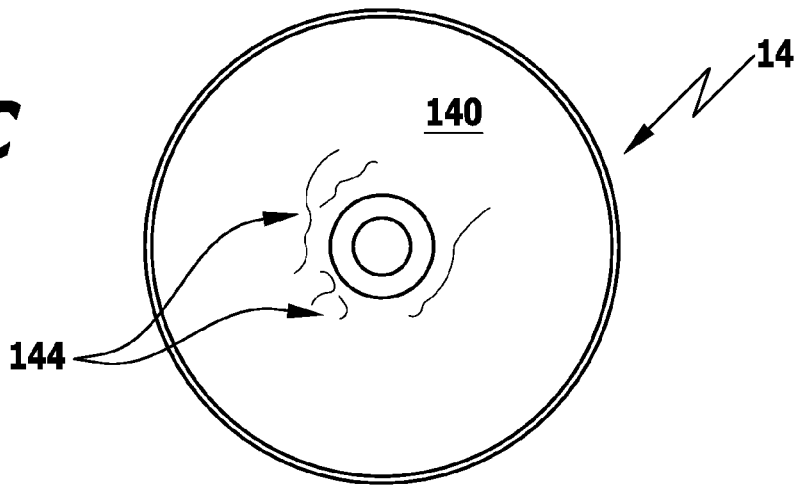
Figure 4D:
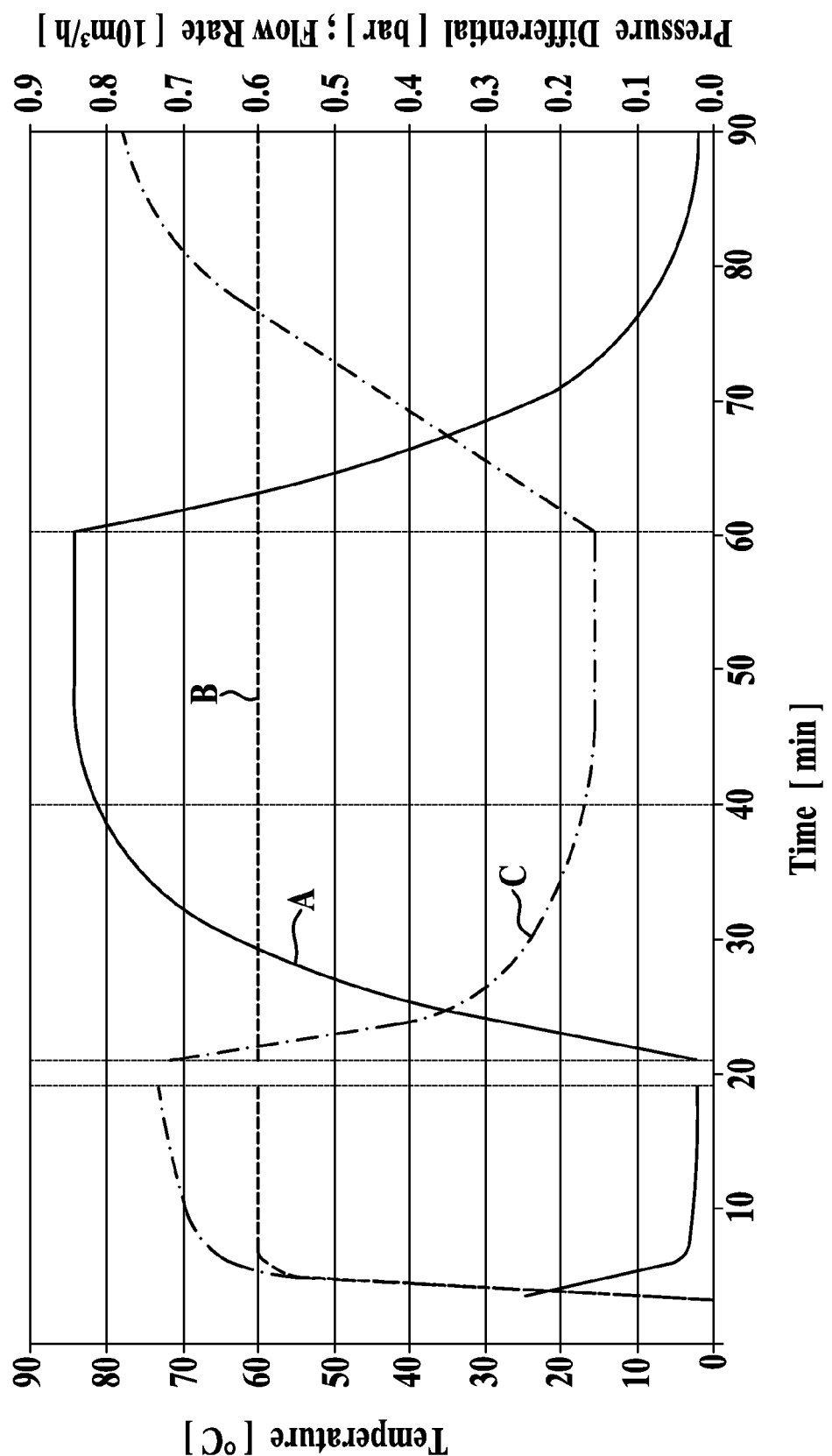

FIG. 4D demonstrates quite nicely the changes occurring in the structure of the deposited layer during the above reconditioning treatment by way of the pressure differential observed (curve C):

During the first step of recirculating cold water in the closed loop of arrangement 10 the pressure differential arrives at a plateau value of 0.73 bar within a few minutes. Upon heating the deposited layer 140 in cartridge 14 the particulate PVPP material expands resulting in a less dense structure and the pressure differential drops to about 0.15 bar.

Upon controlled cooling of the deposited layer 140 the structure thereof becomes again more dense and the pressure differential steadily increases up to a level of 0.77 bar or more, i.e., significantly above the value determined at the beginning for the cracked deposited layer (0.73 bar) indicating curing of the cracks 142.

When the cartridge is removed from housing 12 and the mesh cover 76 has been removed the reconditioned deposited layer 140 can be visually evaluated. As is shown in FIG. 4C the severe cracks were cured and the few remaining minor superficial irregularities 144 on top of layer 140 do not influence the stabilization performance.

Damages as severe as shown in FIG. 4B of the deposited layer of particulate material typically do not occur in fluid treatment practice. Therefore, the test results obtained guarantee that any damage occurred during regular fluid treatment cycles may be cured during an inventive reconditioning procedure.

The importance of selecting a suitable particulate material for forming the deposited layer in cartridge 14 has been explained above in some detail.

Figure 5:
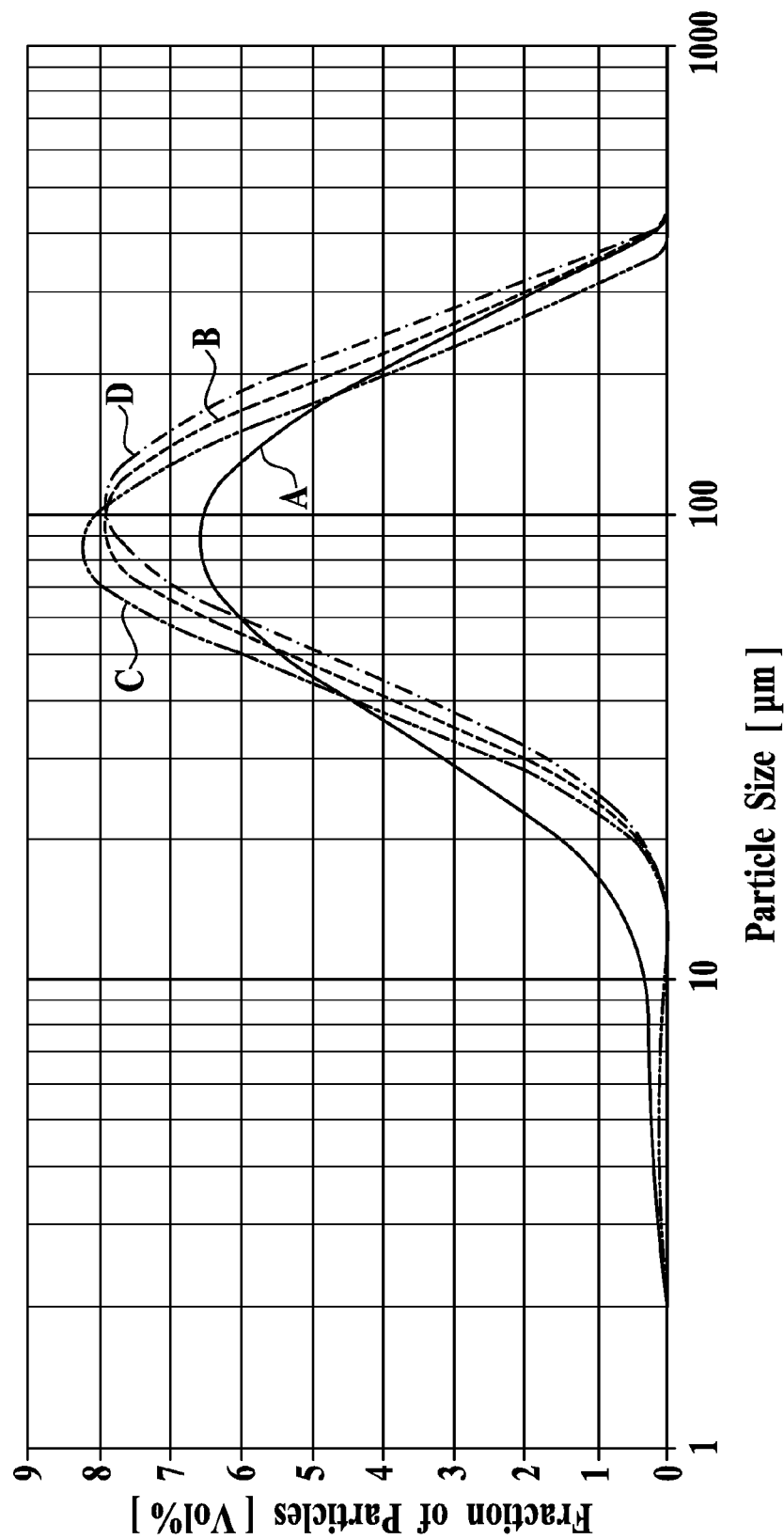
FIG. 5 represents favorable particle distributions of a particulate material to be used in the inventive method.

In the case of PVPP, a typical particle size distribution of commercially available PVPP regenerable food grade particulate material is shown in FIG. 5 as curve A which is relatively broad and includes a substantial amount of small particles.

Upon suspending of the original PVPP particulate material available on the market in an amount of about 5% by weight one or several times in water and decanting the supernatant after a settling time of about 4 h, a particle size distribution according to curve B can be obtained. In contrast to the particle distribution according to curve A, the particle distribution according to curve B shows a significantly improved behavior with regard to pressure drop.

Other particle distributions which will work well are demonstrated in curves C and D, the particle distribution according to curve C having a slightly higher content of small particles than the particulate material corresponding to curve B and D.

The particulate material of the various samples B, C and D may be further characterized by the parameters contained in Table 1.

TABLE 1

| Sample | Fraction with Particle Size < 25 μm [vol %] | $d_{10}$ Value | $d_{50}$ Value | $d_{90}$ Value |
| --- | --- | --- | --- | --- |
| Curve B | 6.2 | 44.6 μm | 104.9 μm | 239.0 μm |
| Curve C | 1.38 | 39.6 μm | 91.3 μm | 204.6 μm |
| Curve D | 2.03 | 45.4 μm | 108.6 μm | 244.2 μm |

Figure 6:
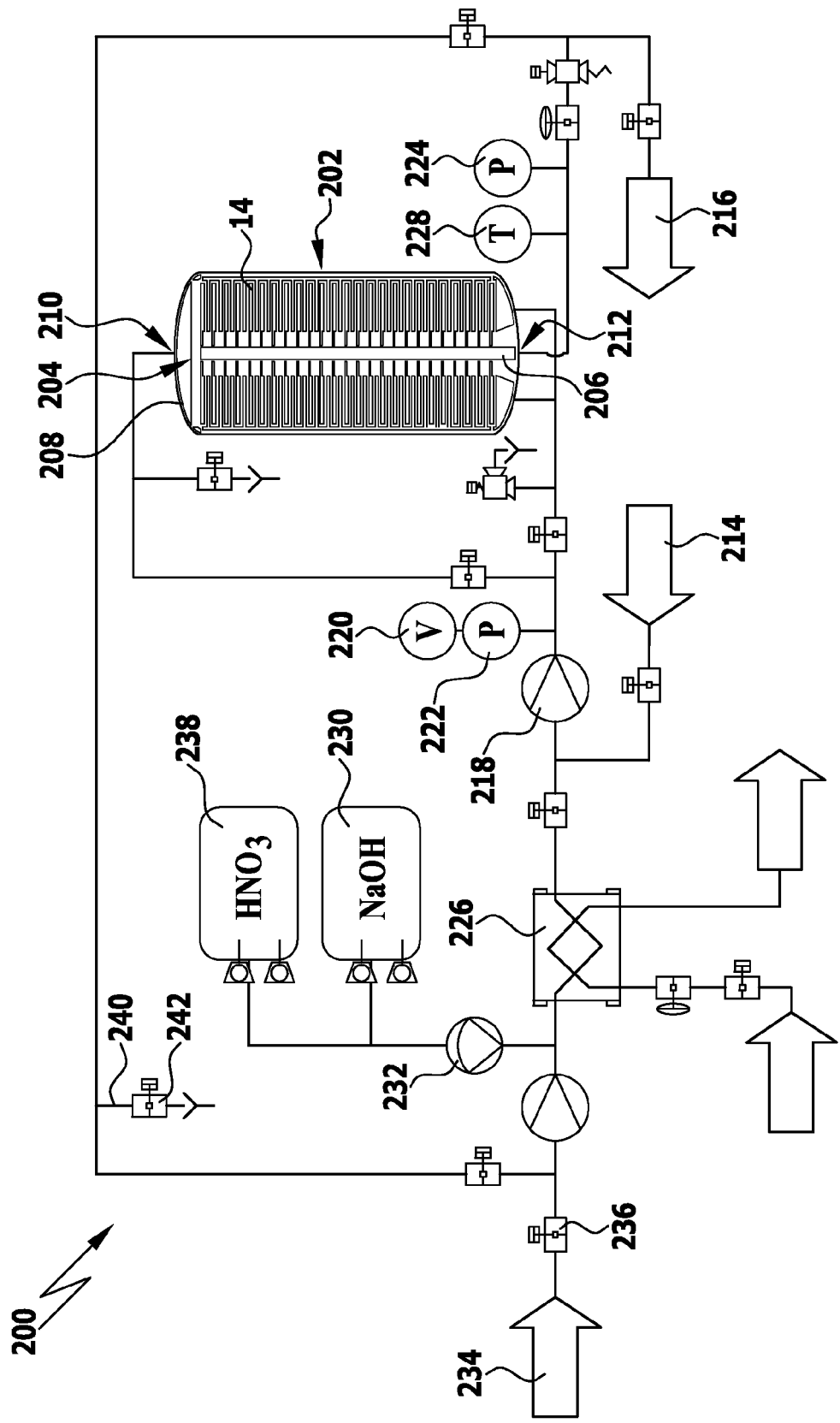
FIG. 6 shows a schematic representation of a fluid treatment system incorporating the inventive method.

FIG. 6 shows a schematic representation of a treatment arrangement 200 for beverages, especially beer, which is used to remove polyphenols from the beer and which also allows to regenerate and recondition the particulate material used for adsorbing and removing the polyphenols.

The arrangement 200 includes a cylindrical housing 202 accommodating a stack 204 of cartridges 14 which are aligned with their central hub portions 64 in order to form a continuous channel 206.

The cartridges 14 have been filled with PVPP particulate material as described in connection with FIG. 3. The particle size distribution of the PVPP material is similar to what is apparent from curve B in FIG. 5.

The housing 202 has an upper removable cover 208 comprising a fluid inlet 210 through which the beverage to be stabilized is introduced into the housing 202.

The beverage then fills all of the volume of the housing 202 and enters into the various cartridges 14 in parallel via their respective upper mesh surface 76 (cf. FIG. 2B), then enters into the deposited layer of particulate PVPP material and exits the cartridges 14 via the mesh layer 72 and the central hubs 64 and channel 206 via outlet 212 at the bottom of housing 202. The beer is fed into the arrangement 200 via the beer inlet 214 and exits the arrangement 200 via the beer outlet 216.

In order to provide a continuous flow of beer, a centrifugal pump 218 is used which is pressure and flow controlled via pressure and flow rate sensors 220 and 222, respectively. The temperature of the beer is typically in the range of 0° C. to about 10° C. and is regarded as the first temperature.

The pressure of the stabilized beer when exiting the housing via outlet 212 is monitored via pressure sensor 224.

The rest of the equipment of arrangement 200 remains inoperative during the stabilization treatment of the beer.

After approximately 6 to 10 hours, the capacity of the particulate material contained in the cartridges 14 is exhausted and a regeneration of the particulate material is needed.

The regeneration step is typically performed by flushing the cartridges 14 and the deposited layers contained therein with a caustic and an acidic fluid, e.g., aqueous NaOH and aqueous HNO$_3$, respectively.

In a first regeneration step, the stack of cartridges 14 and housing 202 is rinsed with water in order to remove residual beer.

Afterwards, the cartridges 14 are heated by circulating the water contained in the arrangement 200 up to a second temperature of 85° C. The second temperature of 85° C. is determined in order to provide a sterilization of the cartridges and their deposited layers as well as housing 202 and the pipes of arrangement 200 before the stack of cartridges 14 is again charged with beer to be stabilized.

The process for regenerating the particulate PVPP material contained in the cartridges 14 may be modified to achieve reconditioning of the deposited layers within the cartridges 14 according to the present invention such that eventually formed cracks or other damages or inhomogeneities in the particle distribution within the deposited layers will be cured so that again the deposited layers of PVPP particulate material are in a state corresponding essentially to an original filling (cf. FIG. 4C).

In order to provide for a smooth heating of the particulate material in the cartridges 14, the temperature of the recirculated water is controlled by heat exchanger 226 such that it is at most 20 to 30° C. higher than the temperature at the outlet of housing 202 (temperature sensor 228).

The flow rate of the heated water is controlled such that the temperature increase per minute is about 5 to 7° C.

During heating of the circulating water and heating of the stack of cartridges 14 in housing 202 or after the second temperature of 85° C. has been achieved, caustic soda is fed from supply 230 by feed pump 232 into the recirculated water until a 1% by weight concentration is obtained.

Circulating of the water containing 1% by weight of caustic soda is continued for 10 min during which time the caustic soda medium is drained from the arrangement 200 via branch pipe 240 and valve 242 in order to remove the desorbed polyphenol contained in the caustic soda solution. The drained portion of the reconditioning/regenerating fluid is replaced by fresh water from water supply 234 via valve 236. The hot water containing caustic soda in the amount of about 1% by weight is then recirculated for another 20 min in a closed loop (valves 236 and 242 closed).

Thereafter, the removal of previously adsorbed polyphenols from the particulate PVPP material has been completed and the alkali fluid is withdrawn from the arrangement 200 through pipe 240 and valve 242 and replaced by fresh hot water from water supply 234 preferably heated to the same temperature as the caustic material previously recirculated when passing through heat exchanger 226. The arrangement 200 is purged with fresh water until the electrical conductivity of the water exciting the housing 202 is below 0.5 mS.

Thereafter, carefully controlled cooling of the stack of cartridges 14 and the deposited layers therein is initiated. According to the present invention, it is most important, that the cooling step is performed under close control of temperature such that no temperature shock is exerted on the deposited layers within the cartridges 14 in order to retain their integrity.

Here, the inlet temperature is controlled to about 10 to 15° C. less than the temperature of the recirculating fluid at the outlet 212 of housing 202. The heat exchanger 226 is now operating as a cooling device.

During the same time, acid, e.g., HNO$_3$, may be dosed into the circuit from supply 238 and feed pump 232 until the amount of acid within the recirculating water reaches about 0.5% by weight.

During recirculating the acidic water, a third temperature is maintained at a level of 20 to 25° C.

This procedure is followed by cold water (from water supply 234) rinsing for another 3 min and the effect of rinsing is controlled by measuring the electric conductivity of the water until it is below the upper limit of 0.5 mS.

The temperature of the fluid used for rinsing may be maintained at about 20° C.

After that step has been completed, the stack of cartridges 14 and their deposited layers are fit for a new cycle of stabilization of a beverage, e.g., beer.

The above procedure has the advantage that the cartridges 14 and the deposited layers of PVPP material may remain within the housing 202 and may be immediately re-used for stabilizing beer.

Likewise, the time typically needed for regenerating the particulate matter by desorbing the adsorbed polyphenol material in a caustic liquid environment may be used at the same time to heat the deposited layers so that both the treatment of the particulate material in order to desorb the polyphenols and heating of the particles in the deposited layer for reconditioning the same may be effected at the same time. Likewise, rinsing of the cartridges and the deposited layers therein and cooling of the same may be effected at the same time so that the reconditioning according to the present invention may be incorporated in the typical regeneration process performed in a regular stabilization process.

The invention claimed is:

1. A method for treating a fluid, the method comprising:
providing a particulate material in the form of a deposited layer having an upstream side and a downstream side;
starting treatment of the fluid by directing a flow of the fluid through the deposited layer from the upstream side to the downstream side at a first temperature;
reconditioning the deposited layer;
resuming treatment of the fluid;
wherein the reconditioning comprises
heating the deposited layer to a second temperature; and
cooling the deposited layer to a third temperature at an average cooling rate in the range of up to about 20° C./min.

2. The method of claim 1, wherein the reconditioning comprises directing a flow of a reconditioning fluid through the deposited layer.

3. The method of claim 2, wherein the reconditioning fluid serves as a coolant while cooling the deposited layer, the reconditioning fluid being optionally circulated through a cooling device.

4. The method of claim 3, wherein the cooling rate is determined as the temperature of the reconditioning fluid serving as a coolant exits the deposited layer at the downstream side thereof.

5. The method of claim 2, wherein the reconditioning fluid serves as a heating medium for the deposited layer when heated to the second temperature, the reconditioning fluid being optionally circulated through a heating device.

6. The method of claim 1, wherein the reconditioning of the deposited layer comprises incorporating an additive into the deposited layer.

7. The method of claim 1, comprising packing the particulate material into a cartridge with a density higher than the bulk density of the particulate material in the wet state to form the deposited layer.

8. The method of claim 1, wherein the particulate material comprises particles with a particle size of less than 25 µm in an amount of about 15% by weight or less.

9. The method of claim 1, wherein the particulate material comprises particles which are swellable in the fluid to be treated.

10. The method of claim 1, wherein the particulate material comprises particles in the form of beads.

11. The method of claim 1, wherein the particulate material comprises particles selected from agarose, PVPP, PA, zeolite, activated carbon, and/or diatomaceous earth.

12. The method of claim 1, wherein the particles of the particulate material are selected from compressible particles.

13. The method of claim 1, wherein the treatment comprises adsorption, filtration, doping and/or subjecting the fluid to a reaction.

14. The method of claim 1, wherein a multiplicity of deposited layers is provided in a common housing having an inlet communicating with the upstream sides of the deposited layers and an outlet communicating with the downstream sides of the deposited layers.

15. The method of claim 14, wherein heating the deposited layer comprises introducing the reconditioning fluid into the housing at its bottom end and/or wherein cooling the deposited layer comprises introducing the reconditioning fluid into the housing at its top end.

16. The method of claim 3, wherein the reconditioning fluid serves as a heating medium for the deposited layer when heated to the second temperature, the reconditioning fluid being optionally circulated through a heating device.

17. The method of claim 4, wherein the reconditioning fluid serves as a heating medium for the deposited layer when heated to the second temperature, the reconditioning fluid being optionally circulated through a heating device.

18. The method of claim 7, wherein the initial density of the packed particulate material of the deposited layer corresponds to up to about 120% of the bulk density in the wet state.

19. The method of claim 18, wherein the initial density is about 101% or more of the bulk density in the wet state.

20. The method of claim 13, wherein the treatment comprises subjecting the fluid to a catalytic reaction.

21. The method of claim 1, wherein the fluid being treated comprises a beverage.

22. The method of claim 21, wherein the beverage comprises beer, wine, or fruit juice.

* * * * *